United States Patent [19]
Adamson et al.

[11] Patent Number: 5,708,527
[45] Date of Patent: Jan. 13, 1998

[54] VIDEO GATEWAY HAVING MOVABLE SCREENS

[75] Inventors: William G. Adamson, Glendora; Gordon E. Liljegren, Burbank; Michael H. Peterson, Glendale; Christopher Brian Smith, Pasadena; David W. Spencer, Saugus; Donald L. Updyke, Jr., Palmdale, all of Calif.; James S. Wassell, New Smyrna, Fla.

[73] Assignees: Sony Corporation, Tokyo, Japan; Sony Corporation of America, Park Ridge, N.J.

[21] Appl. No.: 624,284

[22] Filed: Mar. 29, 1996

[51] Int. Cl.[6] ................................................. G03B 21/56
[52] U.S. Cl. .................. 359/451; 359/443; 359/449
[58] Field of Search ............................. 359/443, 449, 359/451

[56] References Cited

U.S. PATENT DOCUMENTS

4,556,283 12/1985 Numata et al. ...................... 350/170
4,642,945 2/1987 Browning et al. ........................ 52/10

*Primary Examiner*—Safet Metjahic
*Assistant Examiner*—Daniel P. Malley
*Attorney, Agent, or Firm*—Jerry A. Miller; Charles J. Kulas

[57] ABSTRACT

Multiple large screens on movable arms form a gateway beneath which viewers may walk. The screens slide up or down, i.e., toward or away from, the viewers walking below. The screens also pivot in a circular arc to sweep toward, or away from, the viewers. In one embodiment a number of vertical support beams are employed. Elongated arms are attached to the support beams at one end so that the arms can each be rotated about their attached ends. The arms also slide up and down the length of the support beams. Projection screens are attached to the arms so that the screens move as the arms move. In a more specific embodiment each screen is provided with a rear-projection projector for displaying images onto the screens. A computer is used to control the sliding and rotating of the support beams so that preprogrammed patterns can be executed. A computer is also used to control the projectors so that coordinated patterns of images are displayed on the screens.

23 Claims, 6 Drawing Sheets

VIDEO GATEWAY HAVING MOVABLE SCREENS

FIELD OF THE INVENTION

This invention relates in general to displaying images and more specifically to an arrangement of movable display screens for showing images to an audience.

BACKGROUND OF THE INVENTION

Several ways to display images to audiences may be found in the prior art. A familiar way to display video, film, or other images to a large audience is the simple arrangement found in a movie theater. In a movie theater a single large screen is positioned toward the front of the theater. The audience is seated facing the screen and the images are projected from the rear of the theater toward the front of the theater. The screen is parallel to the front wall of the theater, or perpendicular with the ground. Since the projector and screen are well above the audience there is no interference with the projected images by the audience, as when people in the audience get up and move around.

Another approach to displaying images to an audience is to have a large screen which is "rear projected." This allows members of the audience to move around directly in front of, even to the point of touching, the rear-projected images on the screen. Because the projector is projecting from behind the screen onto the rear surface of the screen there is no interference from viewers in front of the screen with the rear-projected image. However, a drawback with the rear projected approach is that the rear-projected screen is a more costly screen. Also, to generate a large image the projector must be a substantial distance behind the screen. The space behind the screen typically cannot be used for other purposes such as a walkway for people.

Yet another approach is a "wall of video." This approach uses several television, or video, screens arranged in a rectangular array to create a large wall of display devices. Each of the display devices may be two or three feet in height and width, respectively. By synchronizing the display of the multiple video screens a composite larger screen is obtained. Also, interesting visual effects can be obtained by dividing up portions of an image among different video screens. That is, rather than using the entire panel of video screens as a single video screen, the panel can be broken up into any number of subsets of screens for independent display of related or unrelated images. This results in a more interesting and unusual attraction.

Although the prior art approaches provide suitable ways to present film or video images to a large audience they are somewhat mundane ways to present images. It is desirable, especially for public attractions, to have a display suitable for large audiences which is also visually exciting and unique in itself. Also, it is desirable to have a large screen display arranged so that the audience need not be stationary. For example, where the display is positioned in a large hallway the audience should be provided a pathway to traverse the hallway without obscuring the view of other audience members. A problem with the prior art is that the larger the screen, the further from the screen the viewer must be in order to comprehend the large picture. In a space such as a hallway it is not possible to place a large screen on the wall for efficient viewing since the hallway walls are relatively close to each other.

SUMMARY OF THE INVENTION

The present invention provides a video "gateway" of multiple large screens on movable arms. The screens are positioned above an audience as, for example, in a hallway, so that the audience may walk through the hallway by passing underneath the video screens. The screens slide up or down, i.e., toward or away from, the audience walking beneath them. The screens also pivot in a circular arc to sweep toward, or away from, the audience.

In a preferred embodiment a number of vertical support beams are employed. Elongated arms are attached to the support beams at one end so that the arms can each be rotated about their attached ends. The arms also slide up and down the length of the support beams. Projection screens are attached to the arms so that the screens move as the arms move.

In a more specific embodiment each screen is provided with a rear-projection projector for displaying images onto the screens. A computer is used to control the sliding and rotating of the support beams so that preprogrammed patterns can be executed. A computer is also used to control the projectors so that coordinated patterns of images are displayed on the screens.

DETAILED DESCRIPTION OF A PREFERRED EMBODIMENT

Figure 1:
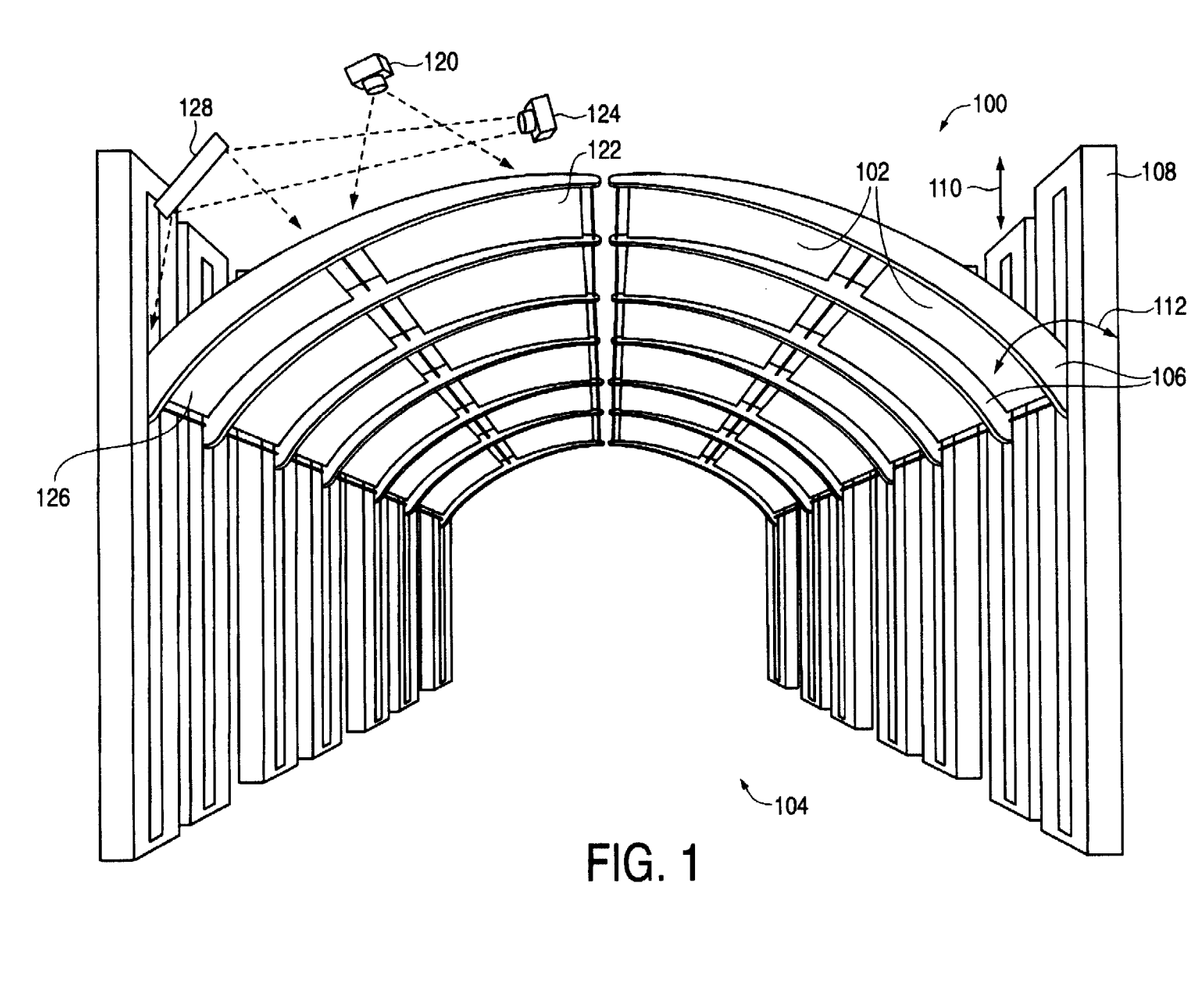
FIG. 1 shows a perspective view of the video gateway of the present invention.

FIG. 1 shows a perspective view of a preferred embodiment of the present invention. In FIG. 1, video gateway 100 provides twenty-four overhead screens organized into pairs such, as screens 102, forming a gateway beneath which people may walk. Pairs of screens such as 102 are supported by two frame arms 106. Frame arms 106 are supported by vertical columns such as column 108. The frame arms are coupled to the columns so that the frame arms may slide up and down in a vertical direction, as shown by arrows 110. Also, the frame arms pivot about a point adjacent to the columns to rotate about an axis at the end of the frame arms as shown by arrows 112. This design is identical for each of the twelve frame arm/screen pair assemblies.

Although this specification may refer to the invention or components of the invention as relating to "video," "screens," "projected" images, etc., any manner of displaying images onto a screen or surface is adaptable for use with the invention. Specifically, although the invention is referred to as a "video" gateway, this is intended to indicate the type of images displayed as animated electronic images and does not limit the invention to video or video related display mechanisms. Further, any type of images may be displayed on the screens of the present invention including still images (i.e., "slides"), arbitrary light patterns as from prism refraction, color filters, shadowing, etc. The images need not move as where the screens are painted or affixed with patterns or left plain.

Each pair of screens such as 102 is independently movable from other pairs of screens. In FIG. 1, all of the twelve pairs of screens are shown in their standard overhead, or "show" position. The show position is most suitable for projecting images onto the screens in a rear-projection arrangement because in the show position the screens are perpendicular to a viewers line of sight as the viewer looks upward. However, images can be displayed with the screens at any angle. The display of images at different screen angles to the viewer's line of sight can produce interesting visual effects.

As shown in FIG. 1, projector 120 is used to project an image onto screen 122. Also, projector 124 projects an image onto screen 126 via mirror 128. Each screen in the video gateway of FIG. 1 has its own projector (not shown). Naturally, different numbers of screens, or different arrangements of screens and projectors is possible. For example, a mirror need not be used to bounce the image of projector 124 onto screen 126. Instead, projector 124 can be mounted along the wall to project directly onto screen 126. Also, rear-projection screens need not be used and the projectors can be located on the viewing side, that is, the downward side, of the screens. It is conceivable that video screens can be used in place of the projection screens shown in FIG. 1. In this case, a screen such as screen 122 would itself be an entire video monitor such as a cathode ray tube (CRT) or other picture tube. The dimensions of today's video screens make it impractical to build a large set of video screens into a video gateway of the type shown in FIG. 1. However, new types of display devices, for example, using flat panel display technology such as color liquid crystal displays or the Plasmatron® by Sony Corporation, will be acceptable for use with the video gateway design shown in FIG. 1.

The arrangement and mobility of the video gateway shown in FIG. 1 provide a visually exciting display system that shows images to a large audience in a unique way. Further, the video gateway is suitable for use in an area where the audience is moving from place to place such as in a hallway. This is in sharp contrast this with present day large screen arrangements where the screen is fixed to the front wall of an enclosure and the audience must remain in a distant stationary position in order to adequately view the image.

In the preferred embodiment, the projectors and motion of the screens is coordinated under computer control. Using preprogrammed information both the motion of the screen and the images displayed on the screens can be coordinated into an artistic and interesting visual display.

Figure 2A:
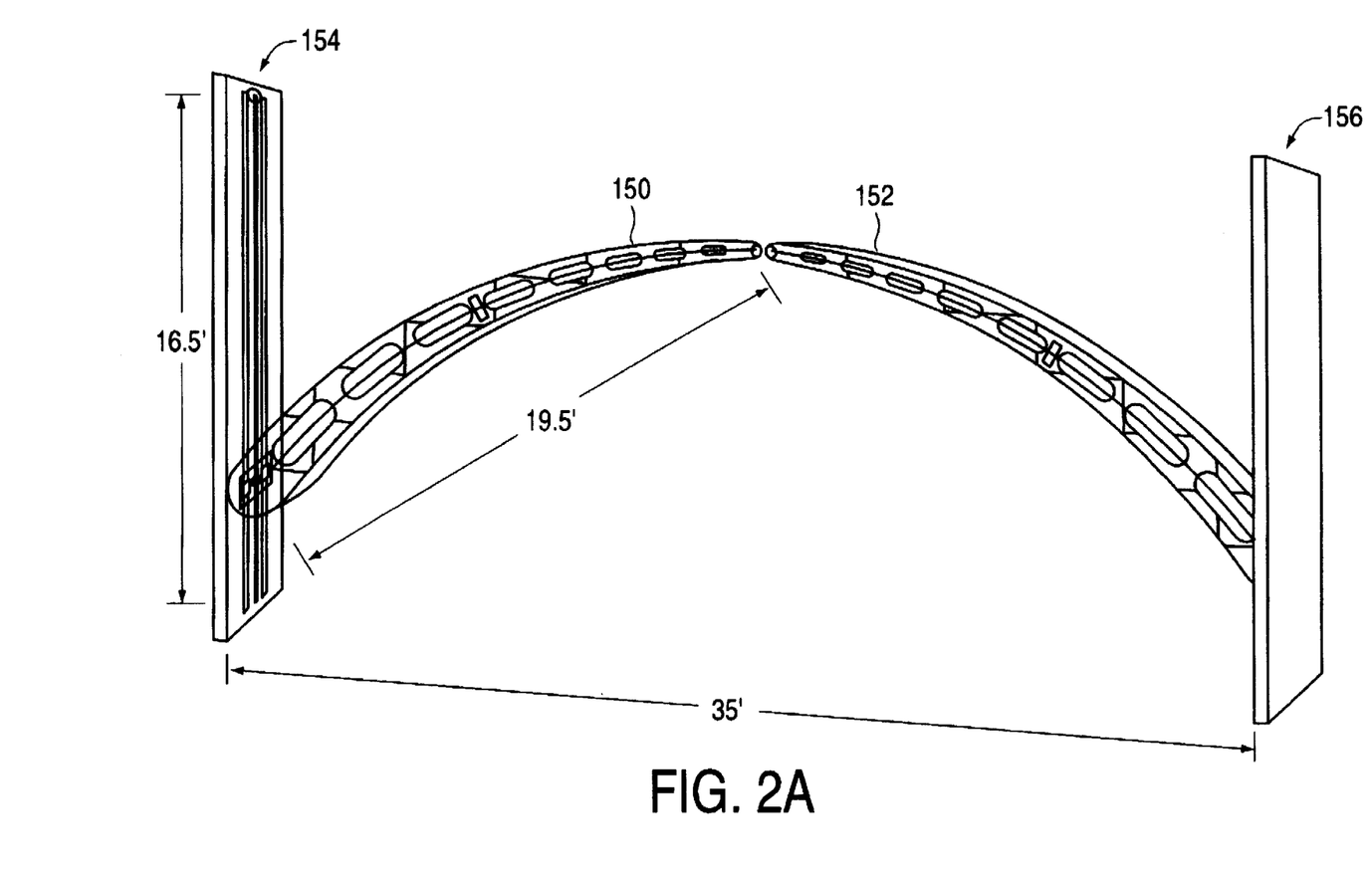
FIG. 2A shows a front view of the video gateway of FIG. 1.
Figure 2B:
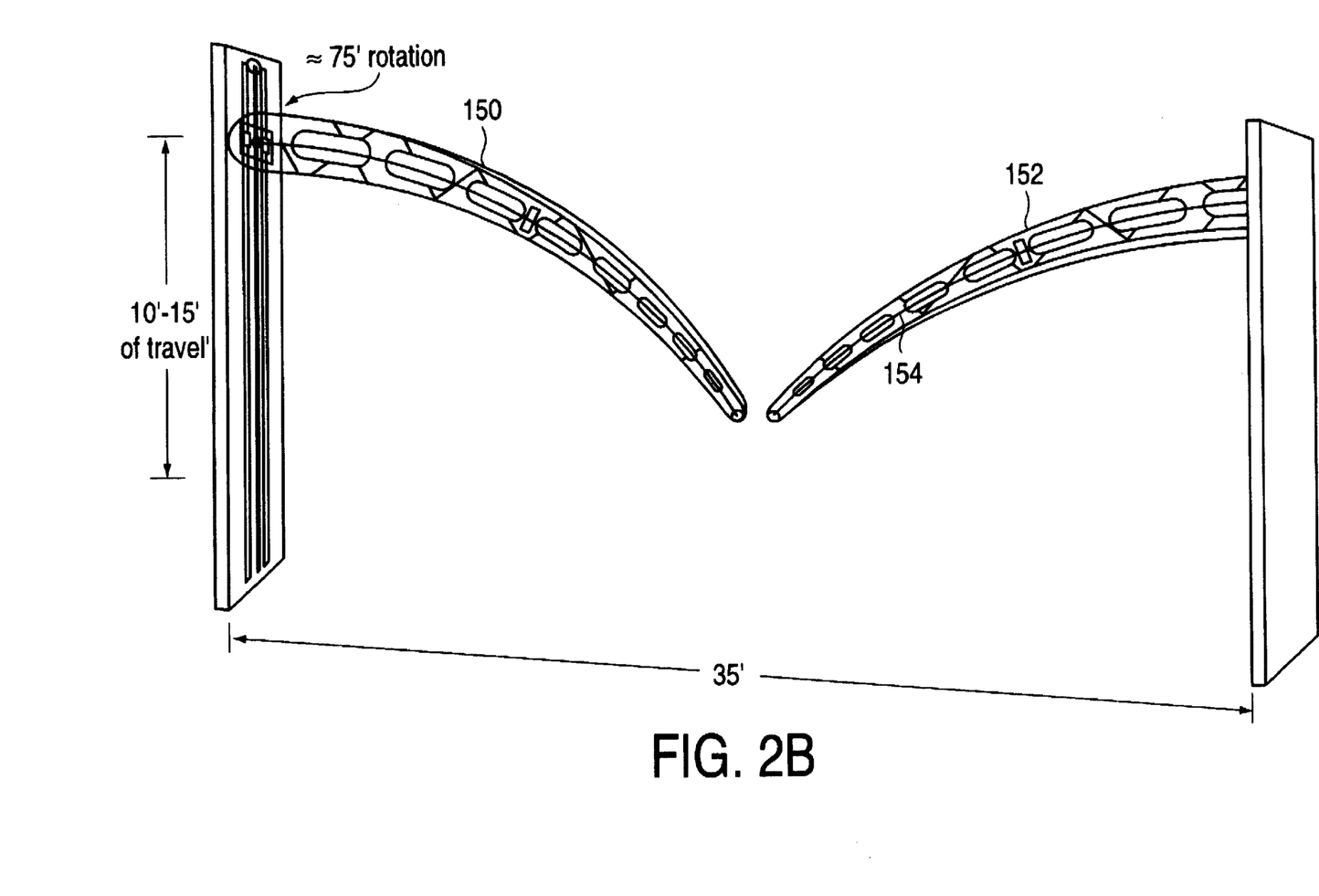
FIG. 2B shows the frame arms of FIG. 2A in a different position.
Figure 2C:
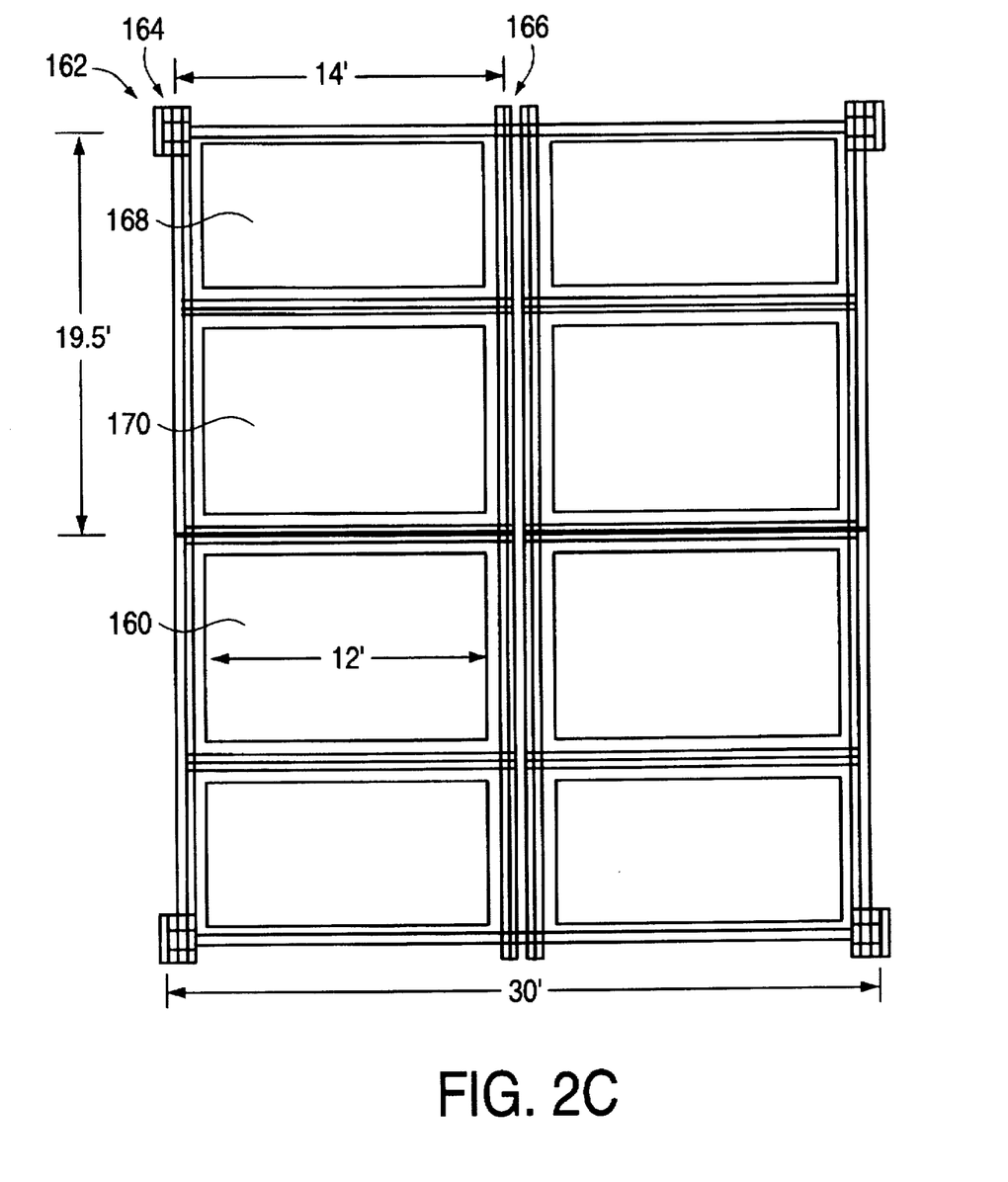
FIG. 2C is an overhead view of four frame assemblies.

FIGS. 2A, 2B and 2C illustrate approximate dimensions of a preferred embodiment of the video gateway.

FIG. 2A shows a front view of the video gateway of FIG. 1. FIG. 2A shows that the span of a frame arm such as frame arm 150 is about 19.5 feet. Two frame arms are used to support each pair of screens. The combination of two frame arms and two screens into a unit is referred to as a "frame assembly." All of the frame arms in the entire video gateway are identical in dimension and shape.

FIG. 2A also shows a vertical slide mechanism at the left and right sides of frame arms 150 and 152. The vertical slide mechanism used to move frame arm 150 is vertical slide mechanism 154 while vertical slide mechanism 156 moves frame arm 152. In the preferred embodiment, the vertical slide mechanisms use jack screws as described below. The jack screws provide for at least 16.5 feet of vertical travel of their corresponding frame arm. Since there are six frame assemblies on each side of the video gateway there must be six or more vertical slide mechanisms on each side of the video gateway. Typically, these would be mounted to a column or other vertical support such as a pillar or other structure and there would be one vertical support per frame arm. Naturally, the vertical slide mechanism should be mounted far enough above the audience walking area so that collisions with the audience will not occur.

FIG. 2B shows the frame arms 150 and 152 of FIG. 2A after the frame arms have both been slid upward and rotated downward from their position as shown in FIG. 2A. Although the extent of travel of the vertical slide mechanism is about 16.5 feet as shown in FIG. 2A, the maximum vertical travel of a frame arm is limited to between about 10 or 15 feet to provide a safety margin. In FIG. 2B the frame arms have been slid upward from their lowest permissible extent to their highest permissible extent.

As shown in FIG. 2B, frame arms are capable of about 75° of rotation. In FIG. 2B they have been rotated downward by about 40° from their rotation angle in FIG. 2A.

The vertical and rotational movement of each frame assembly is independent of the other frame assembly. Thus, in the preferred embodiment, where two frame arms are used per frame assembly, each pair of associated frame arms is moved independently of the other pairs of frame arms in the other frame assemblies.

FIG. 2C shows an overhead view of four frame assemblies. Each frame assembly has the same dimensions. Upper left frame assembly 162 includes frame arm 164, frame arm 166, screen 168 and screen 170. The upper-left frame assembly is shown having a 14 foot width and a 19.5 foot length. The screen within the frame assembly, such as screen 160 of FIG. 2C, has a width of 12 feet. The screens within the frame assemblies are curved to fix the curvature of the frame arms. This can best be seen by referring, again, to FIG. 2B where the screen orientation is shown within frame arm 152 by line 154 approximately bisecting frame arm 152.

In FIG. 2C, four frame assemblies are illustrated. There are two frame assemblies on each side. Two frame assemblies have a length of about 30 feet. The entire video gateway comprises twelve frame assemblies, six on each side of the video gateway, for a length of about ninety feet. This provides a span of about ninety feet below which viewers may walk to traverse a hallway. The large size, overhead positioning, multiple screens and maneuverability of the video gateway provide stationary and moving viewers with many perspectives on the images shown by the video gateway. Further, the video gateway is attractive, unusual and able to change. This serves to hold a viewer's attention and to entice a viewer to come back after a period of time to again view the images.

Figure 3:
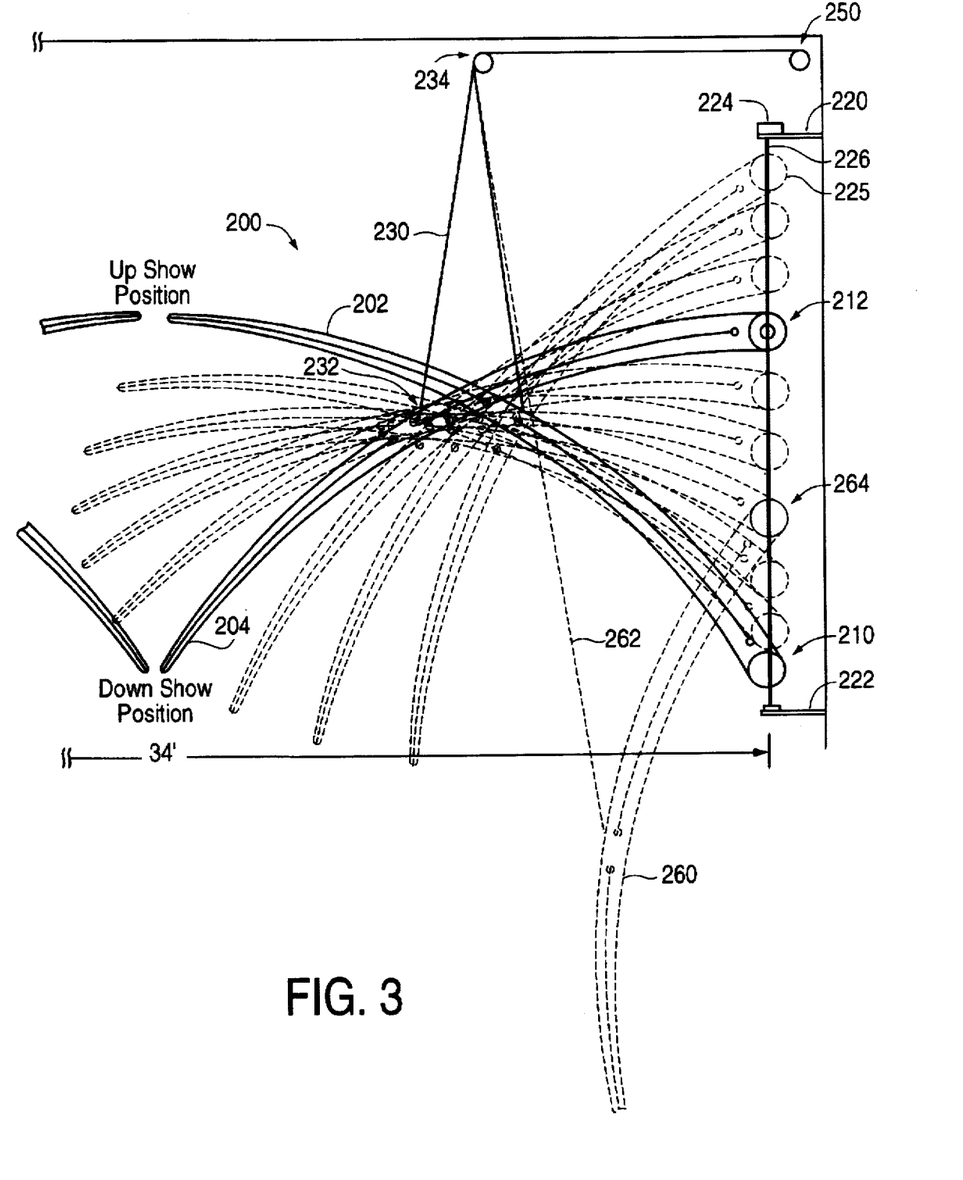
FIG. 3 shows a front view of a frame arm to illustrate the sliding and rotation mechanisms.

FIG. 3 shows a front view of a frame arm 200 to illustrate the sliding and rotation mechanisms used in the preferred embodiment.

In FIG. 3, frame arm 200 is shown in thick lines at two different positions, position 202 and position 204. Position 202 is the show position while in position 204 frame arm 200 is raised upward and rotated downward from position 202. Other positions are shown in faded lines. Arm fragments at positions 206 and 208 are used to indicate the two example positions of a frame arm directly opposite frame arm 200. In practice, opposing frame arms, and the screens attached to the frame arms, need not be positioned in identical positions. That is, each frame assembly is independently positionable with respect to other frame assemblies.

FIG. 3 shows position 210 of the attached end of frame arm 200 at position 202. At position 202, the attached end is near the bottom of the vertical transport mechanism. The vertical transport mechanism includes brackets 220 and 222, motor 224 and jack screw 226. Jack screw 226 is threaded and mated to frame arm 200 in a typical "worm driver" arrangement so that, as jack screw 226 is turned by motor 224, the attached end of frame arm 200 is moved up or down along the jack screw in a manner well-known in the art. The direction of vertical travel of the attached end of frame arm 200 depends on the direction of rotation of the jack screw while the speed of travel of the attached end depends upon the speed of rotation of the jack screw. The travel time of the attached end is such that, in show mode, it takes about one hour to move from end to end of the jack screw.

A point on frame arm 200 is attached by a cable to an overhead point above the frame arm. This is shown at position 204 where cable 230 connects point 232 on the frame arm with overhead point 234. By attaching a point on the frame assembly to an overhead point with a fixed length of cable, the rotation of the frame assembly is automatically accomplished with the vertical movement of the attached end of a frame arm of the frame assembly. That is, when the frame assembly is moved vertically, the cable constrains a point on the frame assembly which causes the entire frame assembly to rotate.

FIG. 3 shows that at position 202, frame arm 200 is at about a +30° angle with respect to the horizontal. At position 204, frame arm 200 is at about a −30° angle with respect to the horizontal. That is, at position 202, the frame arm is pointing upward while at position 204 the frame arm is pointing downward by about the same angle as the upward angle at position 202. By making the rotation of the frame arm, and, hence, its associated frame assembly, dependent on the vertical position of the attached end of the frame arm the number of moving parts and cost of the video gateway is reduced. Of course, flexibility of movement of the frame assemblies is sacrificed since rotation and vertical translation of the frame assembly cannot be done independently of one another.

The design described above can easily be modified in order to make rotation and vertical translation (i.e., sliding) of a frame assembly independent of one another. For example, a motor mechanism can be used at attached end 212 so that the rotation of the frame assembly is performed by a second motor. Alternatively, cable 230 can be lengthened or increased with another motor such as a motor at 250. While using a motor at 250 to adjust the cable length results in a more complicated computation of a resulting pattern of motion of the frame assembly (since both vertical translation using motor 224 and cable adjustment using the motor at 250 affect rotation) this can easily be compensated by using a computer to computer the motor operations and provide a human operator with a simple interface. This is discussed in more detail below.

In the preferred embodiment, while the length of cable 230 is normally fixed between overhead point 234 and point 232 during the show mode of operation of the video gateway, a maintenance mode of operation allows a maintenance person to extend cable 230 so that the frame assembly can be made more easily accessible as for cleaning or repair. The maintenance position is shown in shaded lines at position 260. At position 260, frame arm 200 is extended to an extreme downward angle and the attached end of the frame arm is toward the bottom of the jack screw. Note that the cable 262 at position 260 is much extended from the cable 230 length of position 232. This is in contrast to the cable length at position 204 which is the same as the cable length at position 202. In the preferred embodiment, provision is made for a maintenance operator to place the video gateway into the maintenance mode where the attached ends of all of the frame arms are positioned at their respective position 264 on their respective jack screws.

The cable lengths are then manually adjusted until the frame arms point downward as in the position 260. In the preferred embodiment, a hand crank is provided that is accessible by a maintenance person standing on the floor. The hand crank is used to change the length of the cable between points 232 and 234 to bring the frame arm into a position as shown at 260. Naturally, with automated rotation and vertical translation mechanisms, a computer can be used to lengthen the cable to position the frame arm in the maintenance position. Or to rotate the frame arm into the maintenance position as in the case where a motor is attached to the end of the frame arm to independently control the rotation of the frame arm.

In the preferred embodiment, the lowest position of an attached end of a frame arm, that is, the position at 210, is about 16 feet from the floor. Since a frame arm spans about 19.5 feet, the maintenance position of an attached end at 264 is about 5 feet from the position at 210 so that there is some clearance between the floor and the frame arm tip when the frame arm is in the extreme downward angle of the maintenance position. The extent of movement of the attached end is about 14 feet from position 210 to position 225. The distance from overhead point 234 to the motor or hand crank position at 250 is about 9.5 feet. The distance from position 250 to the floor (not shown) is about 33.5 feet. The distance from jack screw 226 to the opposite jack screw at the opposing end of the video gateway (not shown) is about 34 feet as indicated by the dimension arrow in FIG. 3.

Figure 4:
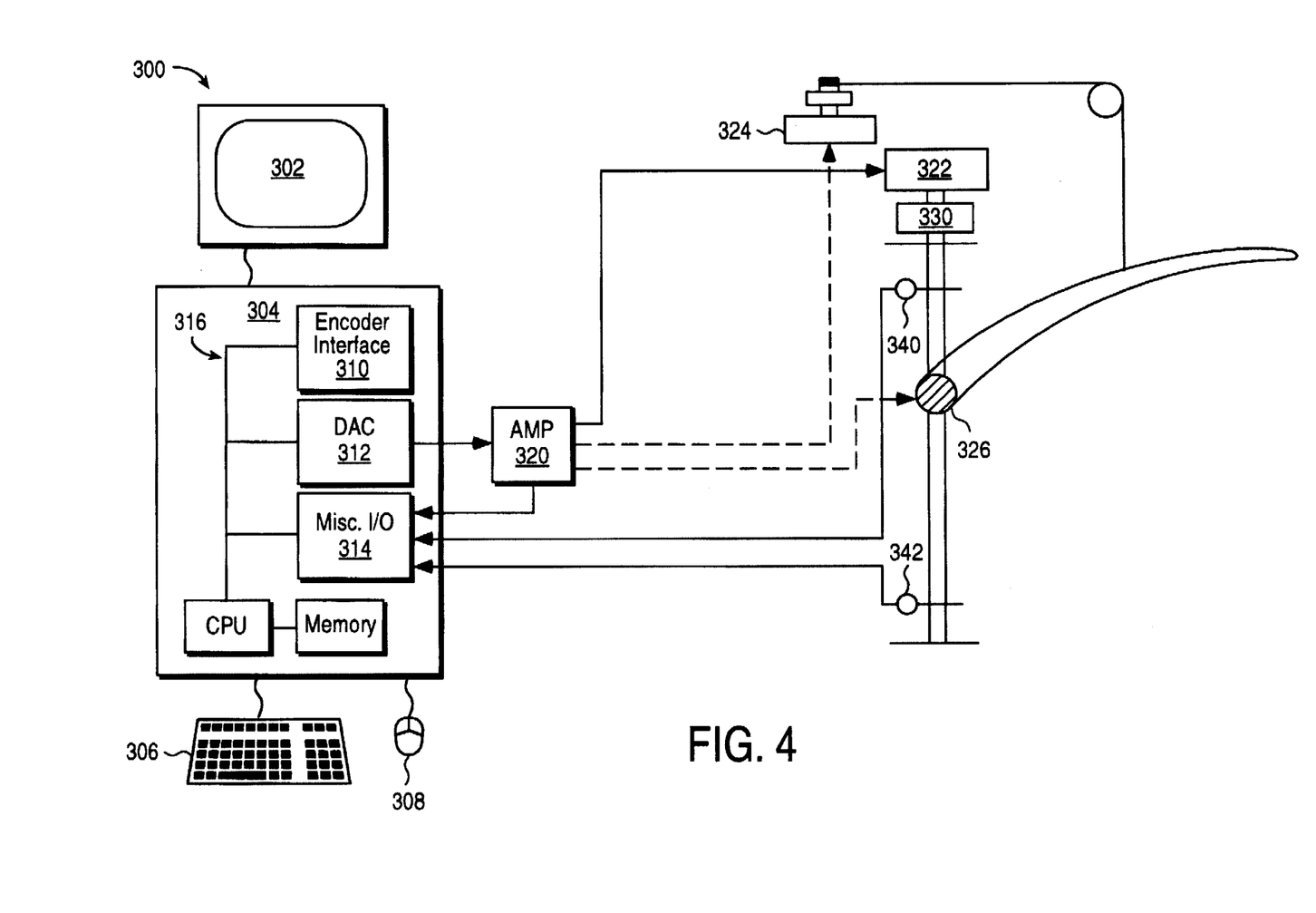
FIG. 4 is a block diagram illustrating the control system of the present invention.

FIG. 4 is a block diagram illustrating the control system of the present invention.

In FIG. 4, a computer system includes display 302, cabinet 304 and input devices such as keyboard 306 and mouse 308. Cabinet 304 includes a central processing unit (CPU), memory and interface cards such as encoder interface 310, digital to analog converter (DAC) 312 and miscellaneous input/output (I/O) card 314. The components within cabinet 304 are connected by one or more buses such as bus 316.

DAC 312 is used to output signals to power amplifier 320 to drive motors such as motors 322, 324 and 326. The preferred embodiment uses a single motor 322. Motors 324 and 326 are used in alternative designs where, as discussed above, it is desired to have independent rotation and translation capability. The position of motor 322 is sensed by an absolute multi-turn rotary encoder 330 which outputs a signal as to the number of turns of motor 322 in forward or reverse directions. The signal output by encoder 330 is received by encoder interface 310 so that the computer system is able to keep track of the vertical position of the attached end of a frame arm. Where additional motors are used, the positions of the apparatus controlled by the motors is similarly sensed.

Miscellaneous I/O card 314 is used to accept various signals such as signals from trip switches 340 and 342. Trip switches 340 and 342 sense when the attached end of a frame arm has reached a limit point. In this case, the action of the control system 300 is to immediately stop the movement of the frame arm. Additionally, miscellaneous I/O card 314 is used to sense whether an over current condition exists in power amplifier 320. By employing a control system such as control system 300 of FIG. 4, a frame arm can be manipulated and sensed. Portions of the control system circuits are replicated to handle the movement and sensing of each frame assembly in the video gateway. Since a computer system is used movements of the video gateway to be preprogrammed and controlled.

The control system provides for at least three modes of operation. In a "programming mode" an operator can specify movements as positions of the frame assemblies to be achieved at a certain point in time. In "show playback mode" the movements are executed. In "maintenance mode" the frame assemblies are positioned for easy access and various tests are performed on the system such as viewing the readings of all of the sensors that may be used in the system (e.g., position, current, temperature, etc.). Other control system architectures may be employed than the one shown in FIG. 4.

Modifications to the foregoing disclosure will be apparent to one of skill in the art. As explained, any type of screen or surface is suitable for use with the present invention. Computerized projection systems can be employed to automate and coordinate the displays of multiple screens. Many variations on the specific arrangement and dimensions given in this specification are possible. The embodiments set forth in the text and Figures of this specification and claims are to be regarded as merely illustrative of but one embodiment, the scope of the invention to be determined solely by the appended claims.

We claim:

1. A display screen apparatus comprising:
   a vertical support beam having a length;
   an elongated arm;
   a display screen coupled to the elongated arm, wherein the display screen displays visual images;
   sliding means for slidably coupling the first end of the elongated arm to the vertical support beam so that the elongated arm can slide along the length of the vertical support beam.
   a jack screw coupled to the vertical support beam;
   a linkage slidably coupling the first end of the elongated arm to the jack screw so that when the jack screw is turned in a first rotational direction the linkage and the elongated arm move in a first vertical direction and when the jack screw is turned in a direction opposite from the first rotational direction the linkage and the elongated arm move in a direction opposite from the first vertical direction;
   a cable coupled between a connection point on the elongated arm and an overhead point, wherein the overhead point is above the elongated arm; and
   a pivoting joint rotatably coupling the first end of the elongated arm to the vertical support beam so that as the elongated arm is moved in a vertical direction it swings about the pivot point as a result of the connection point's coupling to the cable.

2. The display screen apparatus of claim 1, further comprising a motor coupled to the jack screw for mining the jack screw.

3. The display screen apparatus of claim 2, wherein the motor is responsive to control signals for controlling the stopping, starting, speed and direction of the motor, the display screen apparatus further comprising:
   a control system comprising:
      a memory including preprogrammed instructions;
      a processor coupled to the memory for executing the preprogrammed instructions; and
      an interface coupled to the processor for sending control signals from the processor to the motor according to the preprogrammed instructions.

4. The display screen apparatus of claim 2, further comprising a hand crank coupled to the cable for extending or retracting the cable, thereby changing the length of cable between the connection point and the overhead point.

5. The display screen apparatus of claim 3, further comprising a projector for projecting one or more images onto the display screen.

6. The display screen apparatus of claim 3, further comprising:
   instructions in the memory to implement a maintenance mode of operation where the elongated arm is positioned at a predetermined point on the jack screw and the elongated arm is swung downward for access.

7. The display screen apparatus of claim 5, further comprising a projector control system for controlling the projection of the one or more images onto the display screen.

8. The display screen apparatus of claim 7, wherein multiple display screens and elongated arms are used, the display screen apparatus further comprising a frame assembly including a pair of display screens coupled between a pair of elongated arms, wherein the pair of elongated arms are moved in unison to move the pair of screens.

9. The display screen apparatus of claim 8, wherein multiple frame assemblies are used, the display screen apparatus further comprising:
   a first symmetrical row of frame assemblies; and
   a second symmetrical row of frame assemblies, wherein the second symmetrical row of frame assemblies is positioned opposite the first symmetrical row of frame assemblies to provide a mirror image of the first symmetrical row of frame assemblies.

10. The display screen apparatus of claim 9, wherein there are six frame assemblies in the first symmetrical row and six frame assemblies in the second symmetrical row.

11. The display screen apparatus of claim 1, further comprising:
   a computer processor;
   interface means coupled to the computer processor and to the rotation means and sliding means for sending control signals from the computer processor to the rotation means and to the sliding means; and
   a memory coupled to the computer processor, wherein the memory includes a stored computer program for causing the computer processor to output signals for controlling the rotation means and the sliding means to move the elongated arm and display screen in a predetermined pattern.

12. A display screen apparatus comprising:
   a vertical support beam having a length;
   an elongated arm;
   a display screen coupled to the elongated arm, wherein the display screen displays visual images;
   rotation means for rotatably coupling the elongated arm to the vertical support beam so that the elongated arm is rotatable about a predetermined single point at an end of the elongated arm; and
   sliding means for slidably coupling the elongated arm to the vertical support beam at the predetermined single point so that the elongated arm can slide along the length of the vertical support beam in a straight path.

13. The display screen apparatus of claim 12, the sliding means comprising:
   a jack screw coupled to the vertical support beam; and
   a linkage slidably coupling the first end of the elongated arm to the jack screw so that when the jack screw is turned in a first rotational direction the linkage and the elongated arm move in a first vertical direction and when the jack screw is turned in a direction opposite from the first rotational direction the linkage and the elongated arm move in a direction opposite from the first vertical direction.

14. The display screen apparatus of claim 13, the rotation means comprising:

a cable coupled between a connection point on the elongated arm and an overhead point, wherein the overhead point is above the elongated arm so that as the elongated arm is moved in a vertical direction it swings about the pivot point as a result of the connection point's coupling to the cable.

15. The display screen apparatus of claim 14, further comprising a motor coupled to the jack screw for mining the jack screw.

16. The display screen apparatus of claim 15, wherein the motor is responsive to control signals for controlling the stopping, starting, speed and direction of the motor, the display screen apparatus further comprising:

a control system comprising:
    a memory including preprogrammed instructions;
    a processor coupled to the memory for executing the preprogrammed instructions; and
    an interface coupled to the processor for sending control signals from the processor to the motor according to the preprogrammed instructions.

17. The display screen apparatus of claim 16, further comprising a projector for projecting one or more images onto the display screen.

18. The display screen apparatus of claim 16 further comprising:

instructions in the memory to implement a maintenance mode of operation where the elongated arm is positioned at a predetermined point on the jack screw and the elongated arm is swung downward for access.

19. The display screen apparatus of claim 17, further comprising a projector control system for controlling the projection of the one or more images onto the display screen.

20. The display screen apparatus of claim 19, wherein multiple display screens and elongated arms are used, the display screen apparatus further comprising a frame assembly including a pair of display screens coupled between a pair of elongated arms, wherein the pair of elongated arms are moved in unison to move the pair of screens.

21. The display screen apparatus of claim 20, wherein multiple frame assemblies are used, the display screen apparatus further comprising:

a first symmetrical row of frame assemblies; and a second symmetrical row of frame assemblies, wherein the second symmetrical row of frame assemblies is positioned opposite the first symmetrical row of frame assemblies to provide a mirror image of the first symmetrical row of frame assemblies.

22. The display screen apparatus of claim 21, wherein there are six frame assemblies in the first symmetrical row and six frame assemblies in the second symmetrical row.

23. A display screen apparatus comprising:

a vertical support beam having a length;

an elongated arm;

a display screen coupled to the elongated arm, wherein the display screen displays visual images;

rotation means for rotatably coupling the elongated arm to the vertical support beam so that the elongated arm is rotatable about a predetermined single point at an end of the elongated arm;

sliding means for slidably coupling the elongated arm to the vertical support beam at the predetermined single point so that the elongated arm can slide along the length of the vertical support beam in a straight path, the sliding means comprising:

a jack screw coupled to the vertical support beam; and a linkage slidably coupling the first end of the elongated arm to the jack screw so that when the jack screw is turned in a first rotational direction the linkage and the elongated arm move in a first vertical direction and when the jack screw is turned in a direction opposite from the first rotational direction the linkage and the elongated arm move in a direction opposite from the first vertical direction;

the display screen apparatus further comprising:

a cable coupled between a connection point on the elongated arm and an overhead point, wherein the overhead point is above the elongated arm so that as the elongated arm is moved in a vertical direction it swings about the pivot point as a result of the connection point's coupling to the cable;

a motor coupled to the jack screw for turning the jack screw, wherein the motor is responsive to control signals for controlling the stopping, starting, speed and direction of the motor;

a control system comprising:
    a memory including preprogrammed instructions;
    a processor coupled to the memory for executing the preprogrammed instructions; and
    an interface coupled to the processor for s ending control signals from the processor to the motor according to the preprogrammed instructions.

* * * * *